United States Patent
Niemelä et al.

(10) Patent No.: US 7,340,280 B2
(45) Date of Patent: Mar. 4, 2008

(54) METHOD OF CONFIGURING BASE STATION, AND BASE STATION

(75) Inventors: Kari Niemelä, Oulu (FI); Timo Ahonpää, Oulu (FI); Jari Junell, Vantaa (FI); Niko Kiukkonen, Veikkola (FI)

(73) Assignee: Nokia Corporation, Espoo (FI)

(*) Notice: Subject to any disclaimer, the term of this patent is extended or adjusted under 35 U.S.C. 154(b) by 32 days.

(21) Appl. No.: 10/786,597

(22) Filed: Feb. 26, 2004

(65) Prior Publication Data

US 2005/0192055 A1    Sep. 1, 2005

(51) Int. Cl.
*H04M 1/00*    (2006.01)

(52) U.S. Cl. .............. 455/562.1; 455/19; 455/24; 455/62; 455/75; 455/82; 455/87; 455/164.1; 342/199

(58) Field of Classification Search .......... 455/562.1, 455/73, 19, 561, 20, 24, 82, 87, 62, 71, 75, 455/113, 150.1, 164.1, 173.1, 182.1, 192.1, 455/21; 342/165, 199
See application file for complete search history.

(56) References Cited

U.S. PATENT DOCUMENTS

| | | | | |
|---|---|---|---|---|
| 4,419,766 A | * | 12/1983 | Goeken et al. | 455/62 |
| 4,835,499 A | | 5/1989 | Pickett | |
| 5,430,789 A | * | 7/1995 | Ohgami | 455/561 |
| 5,963,854 A | * | 10/1999 | Andreasson et al. | 455/82 |
| 5,963,856 A | | 10/1999 | Kim | |
| 6,101,399 A | * | 8/2000 | Raleigh et al. | 455/561 |
| 6,961,019 B1 | * | 11/2005 | McConnell et al. | 342/357.1 |
| 2002/0041221 A1 | | 4/2002 | Abdulnour | |
| 2002/0053954 A1 | | 5/2002 | Shamsaifar et al. | |
| 2002/0180564 A1 | | 12/2002 | Lotz et al. | |
| 2003/0194973 A1 | * | 10/2003 | Pasternak | 455/77 |
| 2004/0127178 A1 | | 7/2004 | Kuffner | |

FOREIGN PATENT DOCUMENTS

WO    WO 99/41842    8/1999
WO    WO 02/058184 A1    7/2002

OTHER PUBLICATIONS

Shyama Kannangara, et al., "Adaptive Duplexer for Multiband Transreceiver", Radio and Wireless Conference 2003, Aug. 10-13, 2003, pp. 381-384.

* cited by examiner

*Primary Examiner*—Nghi H. Ly
(74) *Attorney, Agent, or Firm*—Squire, Sanders & Dempsey L.L.P.

(57) ABSTRACT

A base station and a method of configuring a base station are provided in a cellular telecommunication system, wherein the base station comprises an electrically tunable duplex filter with a tuning range covering at least two parallel sub-bands used in the telecommunication system. The electrically tunable duplex filter is tunable on site to a sub-band allocated to the base station, thus enabling an increased flexibility in selecting a fixed frequency band to be used in the lower frequency stages in the transceiver and the base band parts of the base station.

19 Claims, 5 Drawing Sheets

METHOD OF CONFIGURING BASE STATION, AND BASE STATION

FIELD

The invention relates to a method of configuring a base station in a cellular telecommunication system, and a base station in a cellular telecommunication system.

BACKGROUND

The radio frequency spectrum is a tightly controlled resource divided into frequency bands allocated to various radio systems and base stations in radio systems. In order to fulfil frequency requirements, each base station operates in a given frequency region.

The frequency spectrum can be divided between different radio access technologies, such as different frequency variants of GSM (Global System for Mobile Communications) system and UMTS (Universal Mobile Telecommunications System). Furthermore, a system band of a radio access technology may be divided into carrier frequencies, from which an appropriate carrier portion is allocated to each base station in the cellular telecommunication system.

The prior art solution suggests a large variety of base stations equipped with a variety of frequency band specific-electronics to cover a desired frequency space in the frequency spectrum. The need for the frequency band-specific electronics complicates the structure and operation of a base station, thus increasing the manufacturing costs of the base station. Therefore, it is desirable to consider improvements in the base station design.

BRIEF DESCRIPTION OF THE INVENTION

An object of the invention is to provide an improved base station of a cellular telecommunication system, and an improved method of configuring a base station. According to an aspect of the invention, there is provided a base station of a cellular telecommunication system, comprising: an antenna unit for radio frequency reception and transmission; an electronically tunable diplexer connected to the antenna unit for separating a transmit radio frequency band from a receive radio frequency band, the tuning range of the electronically tunable diplexer covering at least two radio frequency sub-bands used parallel in the telecommunication system, the diplexer being tunable, on site, to a radio frequency sub-band allocated to the base station; a transceiver connected to the tunable diplexer for performing a conversion between a fixed frequency band and the radio frequency sub-band allocated to the base station; and wherein the transceiver includes a signal conversion chain for performing at least a portion of the conversion, at least a portion of the signal conversion chain being shared between frequencies within the tuning range.

According to another aspect of the invention, there is provided a method of configuring a base station in a cellular telecommunication system, comprising: tuning, on site, an electronically tunable diplexer connected to an antenna unit, the tuning range of the electronically tunable diplexer covering at least two radio frequency sub-bands used parallel in the telecommunication system, to a radio frequency sub-band allocated to the base station; and adjusting a transceiver connected to the diplexer to perform a conversion between a fixed frequency band and the radio frequency subband allocated to the base station, the transceiver including a signal conversion chain for performing at least a portion of the conversion, at least a portion of the signal conversion chain being shared between frequencies within the tuning range. Embodiments of the invention are described in the dependent claims.

The method and system of the invention provide several advantages. The invention provides an enlarged operation frequency scale of a base station and a simplification in the structure of a base station, thus resulting in a cost reduction in setting up and operating a cellular telecommunication system. The simplification in the base station structure includes using a single intermediate frequency, for example, for a broad variety of radio frequencies used in the air interface. Furthermore, the multi-carrier operation of a base station is enabled by using a single transceiver chain.

LIST OF DRAWINGS

In the following, the invention will be described in greater detail with reference to embodiments and the accompanying drawings, in which FIG. 1 shows an example of a structure of a base station;

DESCRIPTION OF EMBODIMENTS

Figure 1:
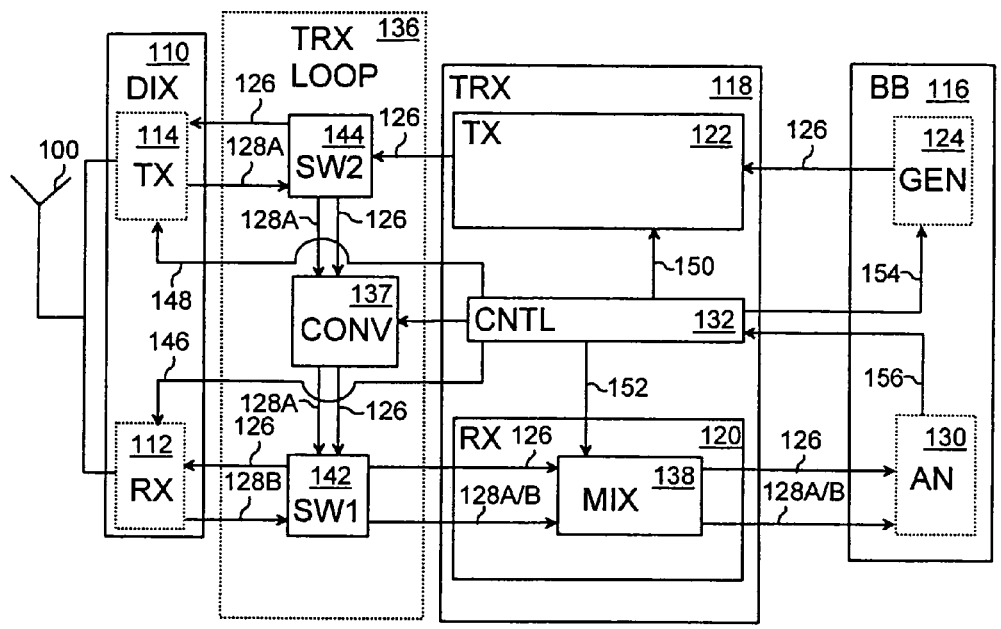

FIG. 1 shows an example of a structure of a base station in a cellular telecommunication system in which the invention may be applied is showed. The structure of a cellular telecommunication system is known per se. The cellular telecommunication system may include at least one of the following systems: GSM850, GSM900, GSM1800, GSM1900, WCDMA, or CDMA200 systems. Furthermore, the invention may be applied to systems such as WLAN (Wireless Local Area Network). The structure of the above systems is known per se and will not be described here.

The base station comprises an antenna unit 100 for radio frequency reception and transmission. The base station further comprises an electrically tunable diplexer 110 connected to the antenna unit 100 for separating a transmit radio frequency band and a receive radio frequency band from each other. The diplexer 110 may also be called a duplex filter. The base station further comprises a transceiver 118 connected to the diplexer 110 for performing a conversion between a fixed frequency and a radio frequency subband allocated to the base station. FIG. 1 also shows a base band unit 116 connected to the transceiver 118.

In an aspect of the invention, the electrically tunable diplexer 110 is tunable while the base station is on-site. In this context, the term "on site" represents a state of the base station, wherein the base station has been installed to its position in the cellular telecommunication system, and is possibly being commissioned for operation.

The diplexer 110 may be functionally divided into a receive portion 112 and a transmit portion 114, the portions 112, 114 being connected to the antenna unit 100. The transceiver 118 may further be divided into a receiver 120 connected to the receive portion 112 of the diplexer 110, and a transmitter 122 connected to the transmit portion 114 of the diplexer 110.

The tunable diplexer 110 may be provided with manufacturer information on the tuning characteristics, such as a tuning curve, according to which the desired tuning range may be obtained.

Figure 2:
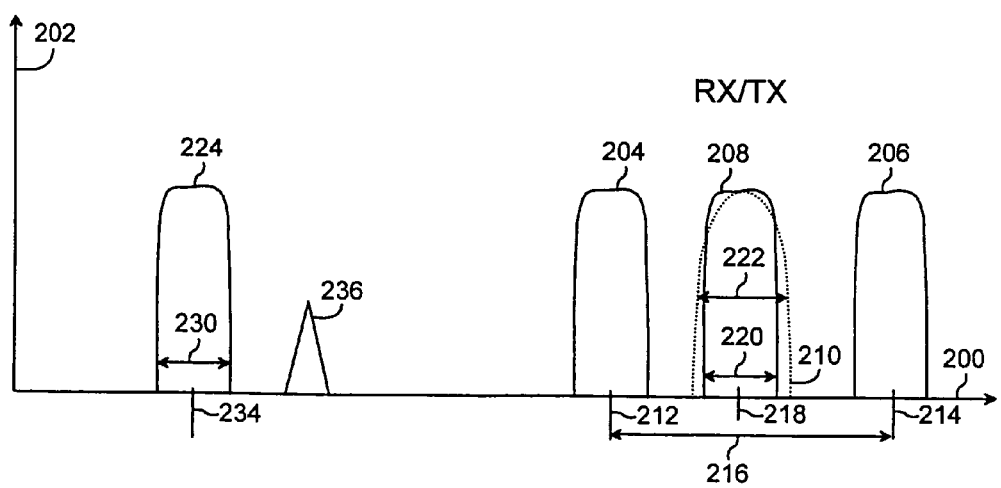
FIG. 2 illustrates an example of a frequency band structure.

FIG. 2 illustrates an example of a frequency band structure used in a cellular telecommunication system on a general level. The horizontal axis 200 shows frequency in arbitrary units while the vertical axis 202 shows signal power in arbitrary units. Radio frequency sub-bands 204 and 206 with center frequencies 212 and 214, respectively, represent parallel radio frequency sub-bands used in a radio interface between the base station and the mobile stations. The tuning range 216 shows the possible positions of the passband 210 of the diplexer 110.

A radio frequency sub-band 204, 206, also called a subband, is typically a portion of a system band. The radio frequency sub-band 204, 206 may present a portion of a receive band of a system band. The subband may further present a portion of a transmit band of a system band. A system band typically defines the operating range of the base station.

The width of the radio frequency sub-band 204, 206 depends on the embodiment. For example, the width of the sub-band 204, 206 may be determined by the number of carrier frequencies allocated to the base station. A typical width of a sub-band may range from 5 MHz to 20 MHz. The presented figures, however, do not restrict the applications of the present solution.

For the ease of illustration, the frequency band structure shown in FIG. 2 represents two different cases.

In the first case, the sub-bands 204 and 206 represent receive sub-bands used in the uplink direction of the telecommunication system. The sub-band 208 represents a receive sub-band allocated to the base station, and the passband 210 represents a passband of the receive portion 112 of the diplexer 110. The fixed frequency band 224 represents the base band or intermediate frequency band in the reception of a base station. The tuning range 216 represents the tuning range of the receive portion 114 of the diplexer 110.

In the second case, the sub-bands 204 and 206 represent transmit sub-bands used in the downlink direction of the telecommunication system. In this case, the sub-band 208 represents a transmit frequency subband allocated to the base station, and the passband 210 represents a passband of the transmit portion 112 of the diplexer 110. The fixed frequency band 224 represents the base band or intermediate frequency (IF) band in the transmission of a base station. The tuning range 216 represents the tuning range of the transmit portion 114 of the diplexer 110.

FIG. 2 also shows spurious frequency components 236 generated in the conversion between the fixed frequency band 220 and the sub-band 208 allocated to the base station. The strongest spurious frequency components may be so-called image frequencies typically generated when the local oscillator frequency of the mixer 138 is mixed with frequency components of the receive sub-band 208 to be converted to the fixed frequency band 224. Thus, the location of the spurious frequency components 236 may vary depending on the frequency of the receive sub-band 208 allocated to the base station, and thus require dynamic filtering.

In an embodiment, the electrically tunable diplexer 110 provides a pass band 210 with band characteristics, such as center frequency 218 and bandwidth 222. The tuning of the diplexer 110 results in shifting the center frequency 218 of the passband 210 of the diplexer 110. In an embodiment, the tuning of the diplexer 110 affects on the passband bandwidth 222. According to the invention, the tuning range 216 of the diplexer 110 covers at least two radio frequency sub-bands 204, 206 used in the cellular telecommunication system. When covering a tuning range 216, the pass band 210 of the diplexer 110 can be shifted continuously between the two sub-bands 204, 206, which in some embodiment may be located in different system bands.

In an embodiment, the transceiver 118 is adjusted to perform a conversion between the fixed frequency band 224 and the sub-band 208 allocated to the base station. The adjustment adjusts the conversion ratio between the frequency of the fixed frequency band 224 and the frequency of the sub-band 208 allocated to the base station. The adjustment is controlled with a transceiver control signal 150, 152 received by the transceiver 118. In the transmitter 122, an up-conversion is performed from the fixed frequency band 224 to a transmit sub-band 208. In the receiver 120, a down-conversion is performed from a receive sub-band 208 to the fixed frequency band 224. In an embodiment, the receiver 120 is a superheterodyne receiver. The fixed center frequency 234 of the fixed frequency band 224 may be chosen according to the operating frequency of the electronics, such as converters carrying out the conversion between the analogue and the digital form of signals in the transceiver 118.

In an embodiment, the tunable diplexer 110 is tunable, on site, to provide a passband 210 narrower than the system band allocated to the base station. This embodiment attenuates undesired frequency components, such as those falling in other system bands, and improves the performance of the transceiver 118.

With reference to FIG. 1, the electrically tunable diplexer 110 receives an electric control signal 146, 148, according to which the center frequency 218 of the passband 210 of the diplexer is adjusted. The operation principles and the structure of an electrically tunable diplexer 110 are known per se, for example, from US patent applications U.S. 2002/0041221 A1 and U.S. 2002/0180564 A1, U.S. Pat. No. 4,835,499, and PCT patent application WO 99/41842, which are thereby incorporated by reference. The electrical tuning, however, may be implemented in a manner different from that presented in the above references.

Figure 3:
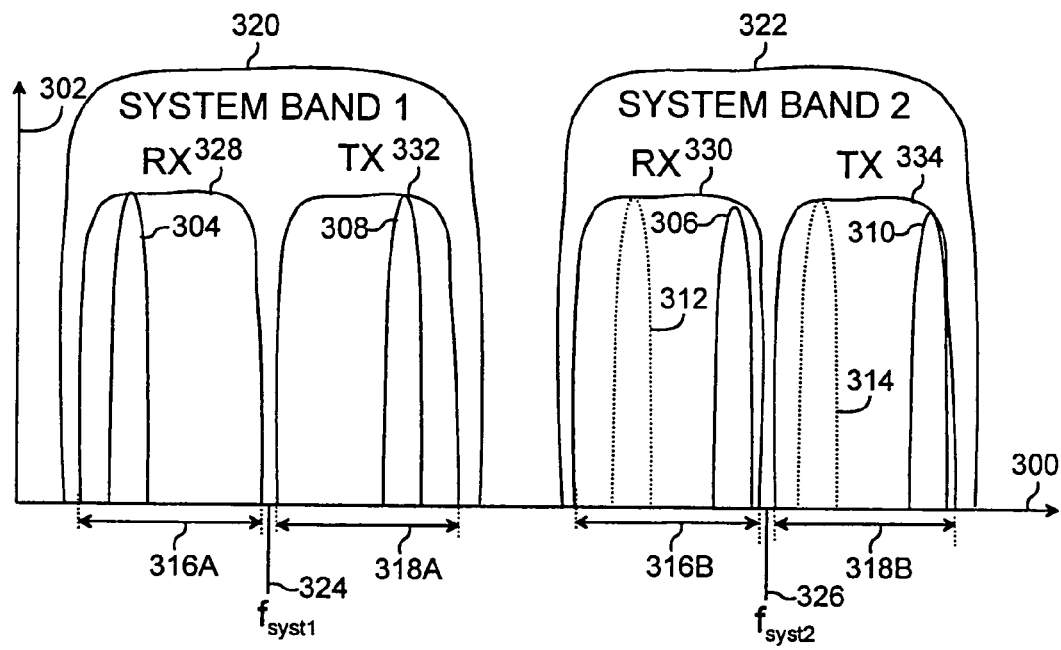
FIG. 3 illustrates a second example of a frequency band structure.

With reference to FIG. 3, the frequency band structure may be composed of at least two system bands 320, 322 with center frequencies 324 and 326, respectively. The horizontal axis 300 shows frequency in arbitrary units while the vertical axis 302 shows signal power in arbitrary units. In an embodiment, the lower center frequency 324 is ~1800 MHz corresponding to the GSM1800 system frequency band while the upper center frequency 326 is ~1900 MHz corresponding to the GSM1900 system frequency band.

In another embodiment, the lower center frequency 324 is ~850 MHz corresponding to the GSM850 system frequency band while the upper center frequency 326 is ~900 MHz corresponding to the GSM900 system frequency band. Each system band 320, 322 may be composed of a receive system band 328, 330 and a transmit system band 332, 334. For the simplicity of illustration, the upper system band 322 represents a system band, from which portions are allocated to the base station. The fixed frequency band corresponding to that shown in FIG. 2 is not shown in FIG. 3.

In an embodiment, the tunable diplexer 110 is configured to operate in a receive tuning range 316A, 316B covering receive sub-bands 304, 306 of at least two system bands 320, 322, the diplexer 110 being tunable, on site, to a receive sub-band 312 allocated to the base station. The receive tuning range 316A, 316B may cover the entire receive system band 328, 330.

In an embodiment, the tuning results in shifting a passband of the receive portion 112 of the diplexer 110 to a desired position in the frequency spectrum. For example, the receive tuning range 316A covers a portion of the frequency range of about 1800 MHz, and the receive tuning range 316B covers a portion of the frequency range of about 1900 MHz, thus enabling implementation of the GSM1800 and GSM1900 radio interfaces by using a single base station and a single diplexer 110, and sharing of the portions of the signal receive conversion chain between the frequencies within the tuning range 316A, 316B.

In an embodiment, the tunable diplexer 110 is configured to operate in a transmit tuning range 318A, 318B covering transmit sub-bands 308, 310 of at least two system bands 320, 322, the diplexer 110 being tunable, on site, to a transmit sub-band 314 allocated to the base station. The transmit tuning range may cover the entire transmit system band 332, 334, In an embodiment, the tuning results in shifting a passband of the transmit portion 114 of the diplexer 110 to a desired position in the frequency spectrum. For example, the transmit tuning range 318A covers a frequency range of about 1800 MHz, and a transmit tuning range 318B of about 1900 MHz, thus enabling implementation of the GSM1800 and GSM1900 radio interfaces by using a single diplexer 110, and sharing of the portions of the signal transmit conversion chain between the frequencies within the tuning range 318A, 318B.

Configuring the electrically tunable diplexer 110 includes, for example, designing the electromagnetic filter cavity such that a desired tuning range is achieved. The tuning may be performed by changing the frequency response of an individual resonator by means of motors and possibly by changing coupling between filter resonators.

In an embodiment, the receiver 120 and the transmitter 122 are adjusted to convert the receive sub-band 306 and the transmit sub-band 310 allocated to the base station to a fixed receive band and a fixed transmit band, respectively. The fixed receive band and the fixed transmit band correspond to the fixed frequency band 224 shown in FIG. 2.

Figure 4:
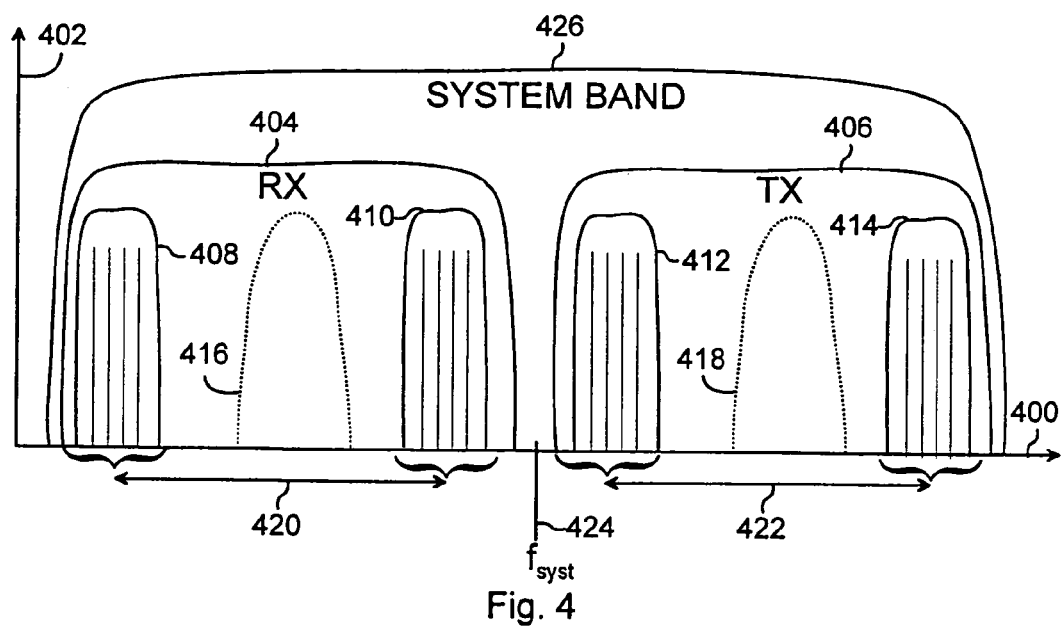
FIG. 4 illustrates another example of a frequency band structure.

FIG. 4 shows a system band 426 with center frequency 424. The horizontal axis 400 shows frequency in arbitrary units while the vertical axis 402 shows signal power in arbitrary units.

The system band 426 is composed of a receive system band 404 and a transmit system band 406. The receive system band 404 covers at least two receive sub-bands 408 and 410, which are composed of receive carrier frequencies represented with vertical lines inside the curves of the receive carrier bands 408, 410.

The transmit system band 406, correspondingly, covers at least two transmit sub-bands 412, 414, which are composed of transmit carrier frequencies represented with vertical lines inside the curves of the transmit carrier bands 412, 414. For example, in the GSM1800 system, the receive system band 404 covers a frequency region from 1715 MHz to 1780 MHZ, while the transmit system band 406 covers a frequency region from 1805 MHz to 1880 MHz, thus requiring a receive tuning range 420 and a transmit tuning range 422 of about 75 MHz, respectively.

The width of the receive sub-bands 408, 410 and the transmit sub-band 412, 414 may vary, for example, from 5 MHz to 20 MHz depending on the number of carriers allocated to the base station. For example in the GSM standard, the separation of adjacent carriers is 200 kHz at a minimum. However, the separation in real systems may be larger than 200 kHz. The receive sub-band 416 and the transmit sub-band 418 represent a receive subband and a transmit sub-band, respectively, allocated to the base station. The fixed frequency band corresponding to that shown in FIG. 2 is not shown in FIG. 4.

In an embodiment, the tunable diplexer 110 is configured to operate at a receive tuning range 420 covering at least two receive sub-bands 408, 410 of the system band 426, the diplexer 110 being tunable, on site, to a receive sub-band 416 allocated to the base station. The receive passband of the diplexer 110 attenuates frequency components, such as carriers, outside the receive carrier band 416 allocated to the base station, thus reducing the bandwidth 230 of the fixed band 224 and removing spurious components from the fixed band 224. The reduced bandwidth 230 of the fixed band 224, on the other hand, results in an increase in flexibility when selecting a suitable conversion ratio between the fixed frequency band 224 and the receive sub-band 416 allocated to the base station. For example, in the GSM1800 system, the 75-MHz bandwidth of the receive system band 404 requires a 150-MHz fixed center frequency 234 at a minimum, whereas the 20-MHz bandwidth of the sub-band 416 obtained with the tunable diplexer 110 allows for a 40-MHz minimum fixed center frequency 234. The decrease in the required minimum center fixed frequency 234 enables use of electrical components, such as analog-to-digital converters, whose dynamic range may be lower compared to the case when the invention is not applied.

In an embodiment, the tunable diplexer 110 is configured to operate in a transmit tuning range 422 covering at least two transmit sub-bands 412, 414, the diplexer 110 being tunable, on site, to a transmit sub-band 418 allocated to the base station. The tuning of the diplexer 110 to the transmit sub-band 418 reduces spurious emissions and wideband noise.

Figure 6:
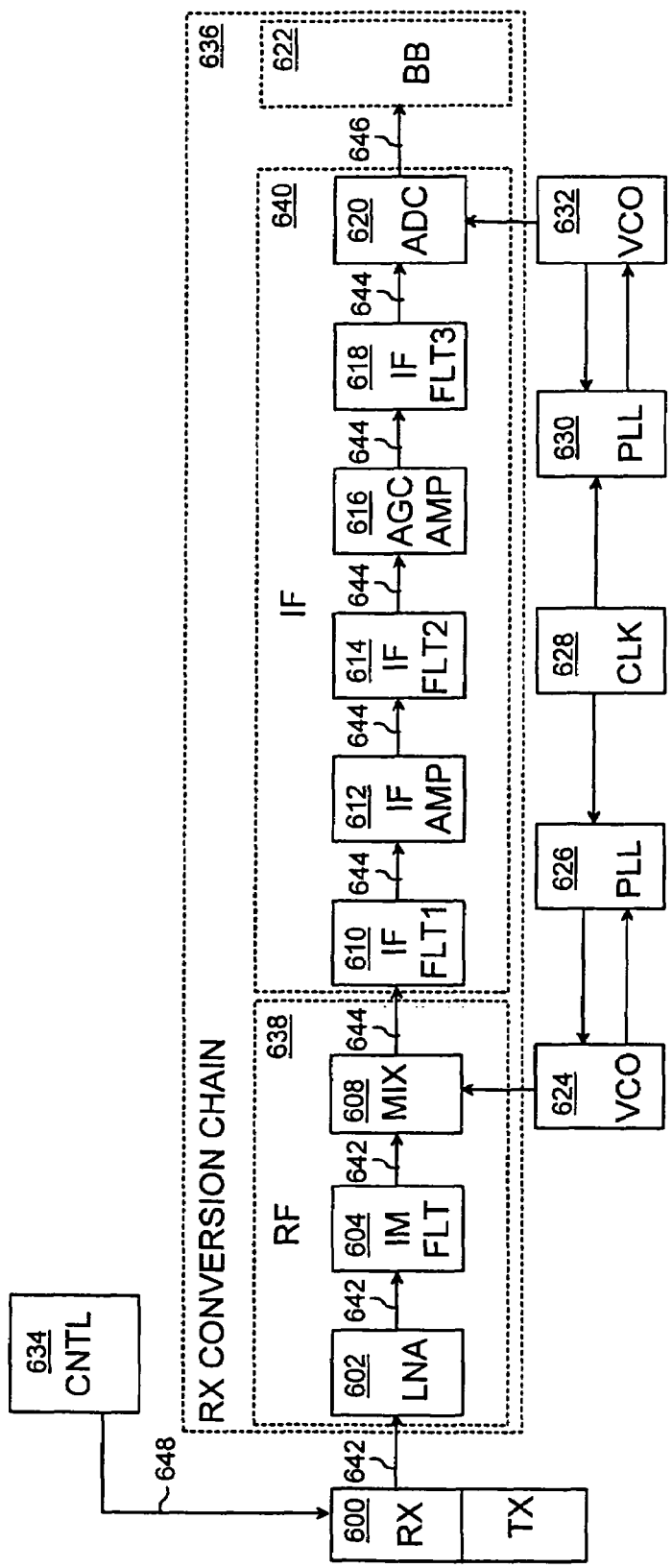
FIG. 6 shows an example of a structure of a transceiver.

With reference to FIG. 6, examine a receive conversion chain 636 of an exemplified transceiver. The exemplified receive conversion chain 636 includes a receive portion of the diplexer 600, a receive amplifier 602, such as a low noise amplifier, for amplifying a radio frequency receive signal 642. After amplification, the radio frequency receive signal 642 is delivered to a mixer unit 608, such as a superheterodyne mixer.

The diplexer 600 is connected to a control unit 634, which provides the diplexer 600 with a control signal 648. The control unit 634 defines characteristics such as the system band frequency and the sub-band frequency of the diplexer 600.

The mixer unit 608 may down-convert the radio frequency receive signal 642 into an intermediate frequency, thus generating an intermediate frequency receive signal 644. A control frequency be inputted into the mixer unit 608 from a voltage controlled oscillator 624, which is further controlled by a phase-locked loop 626. The phase-locked loop 626 may be provided with a reference frequency by a system clock 628. The operation and structure of the voltage controlled oscillators 624 and the associated control mechanism are known to a person skilled in the art.

When the base station is configured to operate at the radio frequency sub-band allocated to the base station, the phase-locked loop 626 is inputted into control information to produce a control frequency, which results in a desired intermediate frequency when mixed with the radio frequency receive signal 642.

The intermediate frequency may be selected based on various criteria. The intermediate frequency may be selected such that the effect of the spurious frequency components generated in the down-conversion may be minimized.

Furthermore, the intermediate frequency may be selected to locate within a Nyqvist zone, such as the first or the second Nyqvist zone, in order to optimise the analog-to-digital conversion performed on the intermediate frequency.

The spurious frequency components generated in mixing the control frequency and the radio frequency receive signal 642 may be attenuated by an image filter 604 and a first intermediate frequency filter 610. The spurious frequencies are functions of the conversion ratio applied in the mixer 608, and therefore, the band of the image filter 604 and that of the first intermediate frequency filter 610 preferably take into account the tuning requirements. In an embodiment, a suitable image filter 604 is chosen from a filter bank including a variety of filters selected for the operating frequency range of the base station. In another embodiment, the band of the image filter 604 is broad enough to cover the possible frequencies.

After filtering in the first intermediate frequency filter 610, the intermediate frequency receive signal 644 may be delivered to an intermediate frequency amplifier 612 for amplification. After amplification, the intermediate frequency receive signal 644 may be delivered to a second intermediate frequency filter 614 connected to the intermediate frequency amplifier 612.

After filtering in the second intermediate frequency filter 614, the intermediate frequency receive signal 644 may be delivered to an automatic gain control amplifier 616 for amplification.

After a further filtering in a third intermediate frequency filter 618, the intermediate frequency receive signal 644 is sampled in an analog-todigital converter unit 620, which generates a digitised intermediate frequency receive signal 646.

The sampling may be controlled by a second voltage controlled oscillator 632 controlled by a second phase-locked loop 630. The sampling rate is typically a variable depending on the frequency characteristics of the radio frequency receive signal 642.

After sampling, the digitised intermediate frequency receive signal 646 may be delivered to a base band unit 622 for further processing.

It is noted that the invention is not restricted to the presented structure of the conversion chain 636 of the exemplified transceiver, but the structure may vary depending on the embodiment.

The exemplified receive conversion chain may be divided into a radio frequency chain 638, which operates at the radio frequency subband allocated to the base station, and an intermediate frequency chain 640 operating at an intermediate frequency.

When a portion of the receive conversion chain 636 is shared between the frequencies within the tuning range 216, at least one component 602 to 620 is used for an entire frequency range within the tuning range 216 of the diplexer 110. For example, the base station may include a single intermediate frequency chain 640, which is used in receiving all the radio frequency sub-bands, which may be allocated to the base station. The details of sharing depend on the embodiment.

In an embodiment, the frequency control arrangement including the voltage controlled oscillators 624, 632, the phase-locked loops 626, 630, and the system clock are shared between the frequencies within the tuning range.

In an embodiment, the transceiver 118 includes a system band specific radio frequency chain 638, and the intermediate frequency chain 640 is shared between different system bands. If there are more than two system bands, a single radio frequency chain 638 may cover two system bands.

In another embodiment, the radio frequency chain 638 and the intermediate frequency chain 640 are shared between the frequencies within the tuning range.

In an embodiment, the base station comprises a control unit 132 connected to the diplexer 110 and the transceiver 118 for controlling frequency characteristics of the base station. In FIG. 1, the control unit 132 is included in the transceiver 118. In another embodiment, the control unit 132 is implemented in the base band unit 116. In an embodiment, the control unit 132 is implemented using a digital signal processor with software. The frequency characteristics of the base station define the prevailing operating frequency, i.e. the sub-band 208 allocated to the base station by using a control signal 154. The frequency characteristics include, for example, a conversion ratio used in the receiver 120 and a conversion ratio used in the transmitter 122 defining the relationship between the radio frequency band 208 allocated to the base station and the fixed frequency 224. The conversion ratio is delivered from the control unit 132 to the transceiver 118 using transceiver control signals 150, 152. The frequency characteristics are delivered to the diplexer 110 using diplexer control signals 146, 148, which control the electronics of the diplexer 110 so that the passband 210 of the diplexer 110 is located in a desired manner in the frequency space.

A transmit conversion chain corresponding to the receive conversion chain 636 may be constructed for transmitting a transmit signal. The transmit conversion chain may include a transmit base band unit, a transmit intermediate frequency chain, and a transmit radio frequency chain. It is clear to a person skilled in the art how to implement a transmit conversion chain and perform sharing of the portions of the transmit conversion chain by using the teachings provided for the receive conversion chain 636. For example, the intermediate transmit chain may be shared.

In an embodiment, the base station comprises a generator 124 connected to the transmitter 118 for providing the diplexer 110 with an input test signal 126 characterizing a frequency band 210 allocated to the base station, a TRX loop 136 connected to the diplexer 110 and the transceiver 118 for delivering a portion of the input test signal 126 and a portion of an output test signal 128A, 128B generated from the input test signal 126 in the diplexer 110 to the receiver 120, an analyser 130 connected to the receiver 120 and the control unit 132 for determining the response of the diplexer 110 to the input test signal 126 based on a portion of the input test signal 126 and a portion of the output test signal 128A, 128B, and a control unit 132 connected to the diplexer 110 and the generator 124 for controlling tuning of the diplexer 110 based on the response of the diplexer 110 to the input test signal 126.

The generator 124 may be implemented using a digital signal processor in the base band unit 116 or using an ASIC (Application Specific Integrated circuit). The input test signal 126 is received in the transmitter 122, which converts the input test signal 126 from a digital form to an analogue form and up-converts the base band test signal 126 to a radio frequency characterizing the frequency band 208 allocated to the base station. The input test signal 126 is inputted into the diplexer 110, wherein an output test signal 128A, 128B is generated from the input test signal 126.

The output test signal 128A, 128B is generated in the diplexer from the input test signal 126, thus carrying information on the response of the diplexer 110 to the input test signal 126. If the input test signal 126 is chosen appropriately, the frequency characteristics of the diplexer 110 can be determined by comparing the input test signal 126 and the output test signal 128A, 128B.

In an embodiment, the input test signal 126 is a single carrier, such as the outermost carrier in the transmit carrier band 414. The test signal 126 may also be composed of several carriers representing the frequencies of the carrier band 410, 414 allocated to the base station. The test signal 126 may also be performed by sweeping over a frequency range representing the frequency band 208 allocated to the base station.

If the diplexer 110 comprises several parallel filters with different passbands, the input test signal 126 is composed of orthogonal components so that the group of parallel filters can be tuned simultaneously.

The TRX loop 136 connects the transmit end comprising the transmit portion 114 of the diplexer 110 and the transmitter to the receive end comprising the receive portion 112 of the diplexer 110 and the receiver. The TRX loop 136 comprises a transmit switch 144 and a receive switch 142. The purpose of the switches 144, 142 is to conduct a portion of the input test signal 126 from the transmit end to the receive end of the base station and to deliver a portion of the output test signal 128A, 128B generated in the diplexer to the receiver 120. In an embodiment, the switches 142, 144 comprise directional couplers, whose operational principle and structure are known to a person skilled in the art. The portion of the input test signal 126 represents a reference signal with which the output test signal 128A, 128B is compared when determining the response of the diplexer 110.

A portion of the input test signal 126 and a portion of the output test signal 128A, 128B are received by the receiver 120. The receiver 120 down-converts a portion of the input test signal 126 and a portion of the output test signal 128A, 128B to the base band frequency and outputs a portion of the input test signal 126 and a portion of the output test signal 128A, 128B to the analyser 130. The analyser 130 receives a portion of the input test signal 126 and a portion of the output test signal 128A, 128B and determines the response of the diplexer 110 to the input test signal 126 by using the portion of the input test signal 126 and the portion of the output test signal 128A, 128B. The analyser 130, for example, determines an impulse response for the input test signal 126 and the output test signal 128A, 128B, and determines the response of the diplexer 110 to the input test signal 126 by using the determined impulse responses. In an embodiment, at least a portion of the analyser 130 is implemented in the base band unit 116 using a digital signal processor with software. In another embodiment, at least a portion of the analyser 130 is implemented using an ASIC.

In an embodiment, the analyser 130 determines a return loss of the input test signal 126 using a portion of the input test signal 126 and a portion of the output test signal 128A, 128B, the return loss representing the response of the diplexer 110 to the input test signal 126.

In an embodiment, the input test signal 126 includes channel coding, which is used in decoding the output test signal 128A, 128B in the analyser 130.

The analyser 130 sends a report 156 on the response of the diplexer 110 to the control unit 132, which forms a diplexer control signal 146, 148 for tuning the diplexer 110. In an embodiment, the control unit 132 compares the response, such as return loss, to a predetermined reference value, and modifies the diplexer control signal 146, 148 accordingly. The predetermined value of the return loss may be 20 dB, for example. If the determined response is below a predetermined value, the control unit 132 may command the diplexer 110 to shift the passband 210 to a direction where the response is closer to the predetermined reference value. The control unit 132 may also memorize the responses from earlier tuning steps and predict a favourable position for the passband 210 using the memorized responses.

In an embodiment, the transmit switch 144 connects a portion of the input test signal 126 to the transmit portion 114 of the diplexer 110, wherein an output test signal 128A is generated from the portion of the input test signal 126. A portion of the output test signal 128A and a portion of the input test signal 126 are connected to the receiver 120 by the receive switch 142. FIG. 1 illustrates an embodiment where the transmit switch 144 is located between the transceiver 118 and the diplexer 110, and the generation of the output test signal 128A is based on a reflection mechanism of the input test signal 126 from the diplexer 110. In another embodiment, the transmit switch 144 is located between the diplexer 110 and the antenna unit 100 so that a portion of the output test signal 128A transmitted by the diplexer 110 is delivered to the receiver 130. This embodiment represents the TX tuning mode, wherein the transmit portion 114 of the diplexer 110 is tuned.

In an embodiment, the transmit switch 144 and the receive switch 142 connect a portion of the input test signal 126 to the receive portion 112 of the diplexer 110. The output test signal 128B is generated in the receive portion 112 of the diplexer 110 and connected to the receiver 120 by the receive switch 142. FIG. 1 illustrates an embodiment where the generation of the output test signal 128B is based on a reflection mechanism of the input test signal 126 from the receive portion 112 of the diplexer 110. In another embodiment, a portion of the transmit switch 144 is located between the antenna unit 100 and the diplexer 110 so that the input test signal 126 enters the receive portion 112 of the diplexer 110 from the antenna side. As a result, the output test signal 128B represents a portion of the input test signal 126 which passes the receive portion 112 of the diplexer 110. This embodiment represents the RX tuning mode, wherein the receive portion 112 of the diplexer 110 is tuned.

In an embodiment, the TRX loop 136 is configured to convert a portion of the input test signal 126 to a receive sub-band 208 allocated to the base station. The conversion may be performed using a converter 137 located in the TRX loop 136. The operation of the converter 137 may be based on mixing a suitably chosen local oscillator frequency with the transmit frequency applied to the input test signal 126 in the transmitter 122 so that the superposition of the two frequencies includes a frequency component at the receive subband 208. The converter 137 may further comprise a filter means for attenuating undesired components generated in the mixing procedure.

In an embodiment, the TRX loop 136 is configured to convert a portion of the output test signal 128A to a receive sub-band 208 allocated to the base station. This embodiment may be applied when the output test signal 128A is generated in the transmit portion 114 of the diplexer 110. The conversion may be performed using a converter similar to that described above.

Figure 7:
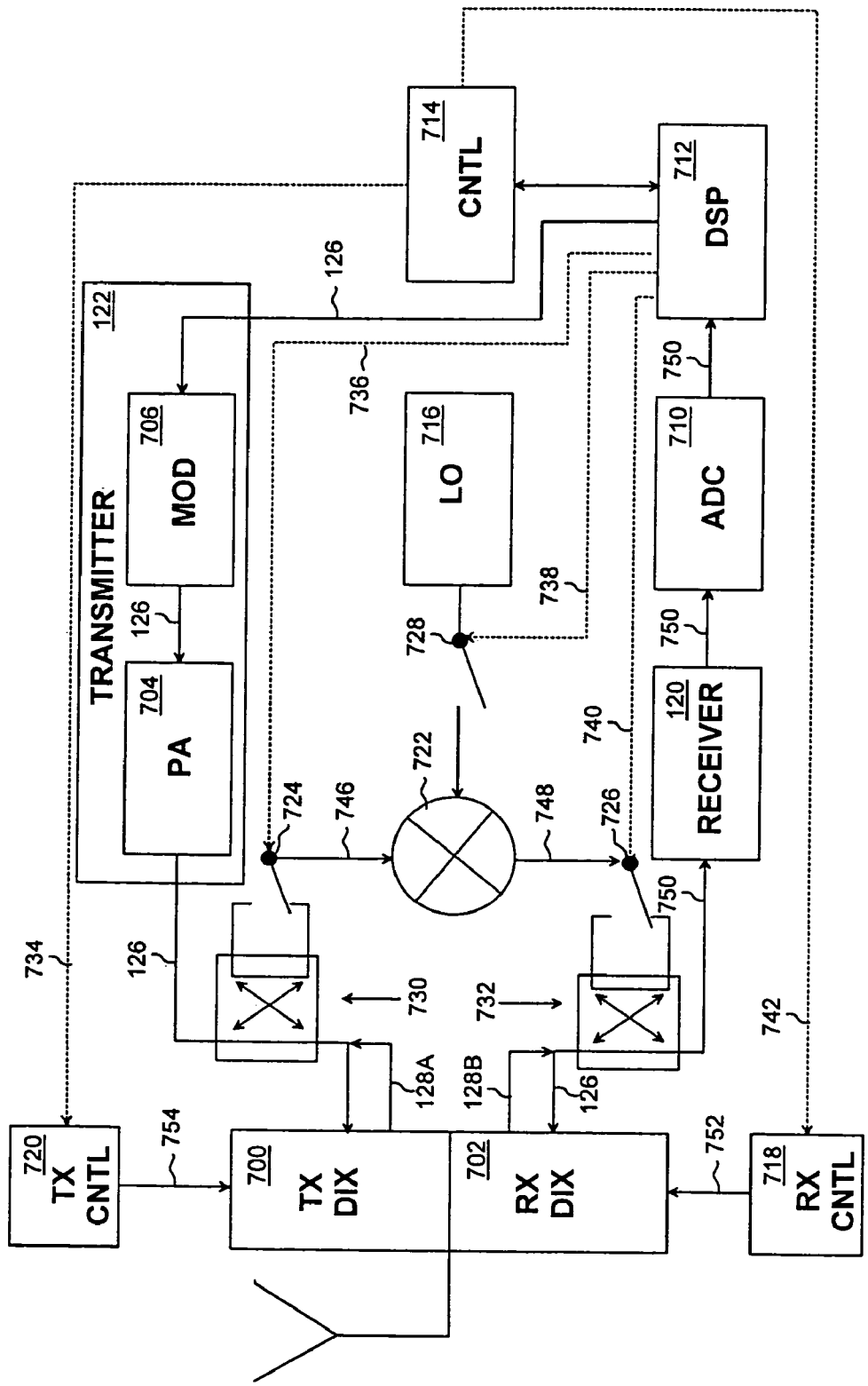
FIG. 7 shows an example of a tuning arrangement.

With reference to FIG. 7, an example of a tuning arrangement of the base station is shown. The tuning arrangement includes a transmit control unit 720 connected to the transmit portion 700 of the diplexer, and a receive control unit 718 connected to the receive portion 702 of the diplexer.

The transmit control unit 720 and the receive control unit 718 provide tuning control signals 754 and 752 for the transmit portion 700 and the receive portion 702, respectively. The transmit control unit 720 and the receive control unit 718 receive tuning instructions 734, 742 from a tuning control unit 714.

The transmit control unit 720, the receive control unit 718 and the tuning control unit 714 correspond to the control unit 132 shown in FIG. 1.

The input test signal 126 may be generated in the digital signal processor 712 in the base band frequency, converted to an analog format and up-converted in the modulator 706 to the radio frequency. The input test signal 126 may be amplified in an amplifier unit 704, such as a power amplifier, and fed into the TRX loop.

The TRX loop shown 136 includes a first directional coupler 730 and a mixer 722, and a first switch 724 between the first directional coupler 730 and the mixer.

The TRX loop further includes a second directional coupler 732 and a second switch 726 between the second directional coupler 732 and the mixer 722.

In a first position, the first switch 724 couples the input test signal 126 to the mixer 722. In this case, the mixer input signal 746 may be the input test signal 126. The first position may be applied both in the RX and in the TX tuning mode in order to deliver the input test signal 126 to the transmit portion 720.

The first position may further be applied in the TX tuning mode, when the input test signal 126 is used as a reference for the output test signal 128B from the receive portion 702.

In a second position, the first switch 724 couples the output test signal 128A from the transmit portion 700 to the mixer 722. In this case, the mixer input signal 746 may be the output test signal 128A generated in the transmit portion 700. The second position may be applied in the TX tuning mode.

The first switch 724 is controlled with a first switch control signal 736 provided by the digital signal processor 712. The switch instructions may be obtained from the tuning control unit 714.

In a first position, the second switch 726 couples the mixer output signal 748 to the receiver 120. In the TX tuning mode, the mixer output signal 748 may be the output test signal 128A generated in the transmit portion 700. If the input test signal 126 is used as a reference signal for the output test signal 128A, the mixer output signal 748 may be the input test signal 126.

In a second position, the second switch 726 couples the mixer output signal 748 to the receive portion 702. The mixer output signal 748 may be the input test signal 126, which is delivered to the receive portion in order to generate the output test signal 128B in the receive portion.

The second switch 726 is controlled with a second switch control signal 740 provided by the digital signal processor 712. The switch instructions may be obtained from the tuning control unit 714.

The mixer 722 converts the mixer input signal 746 to a mixer output signal 748. The mixer 722 is provided a local oscillator frequency by a local oscillator, which local oscillator frequency is co-added with the frequency of the mixer input signal. The local oscillator frequency may be chosen such that the frequency of the mixer output signal 748 characterizes the frequency of the sub-band allocated to the base station. In an embodiment, there is a switch 728 between the mixer 722 and the local oscillator 716, which switch is controlled with a switch control signal 738 provided by the digital signal processor 712.

A receiver input signal 750, which depending on the tuning mode, may be the input test signal 126, the output test signal 128A from the transmit portion 700, or the output test signal 128A from the receive portion 702 is inputted into the receiver 120. The structure of the receiver 120 may be similar to that shown in FIG. 6.

The receiver 120 outputs an analog signal, such as an intermediate frequency receive signal, into an analog-to-digital converter 710, which outputs a digitised signal into the digital signal processor 712.

The digital signal processor 712 performs signal processing tasks, such as channel decoding, on the digitised signal. The digital signal processor may further analyze the output test signal 128A, 128B and provide results on the analysis to the tuning control unit 714.

The tuning control unit 714 processes the results on the analysis and controls the transmit control unit 720, and receive control unit 718, and the test signal generator accordingly. The tuning control unit 714 may provide control parameters to the transmit control unit 720, and receive control unit 718, according to which control parameters the control unit 720, receive control unit 718 control the diplexer settings.

Figure 5:
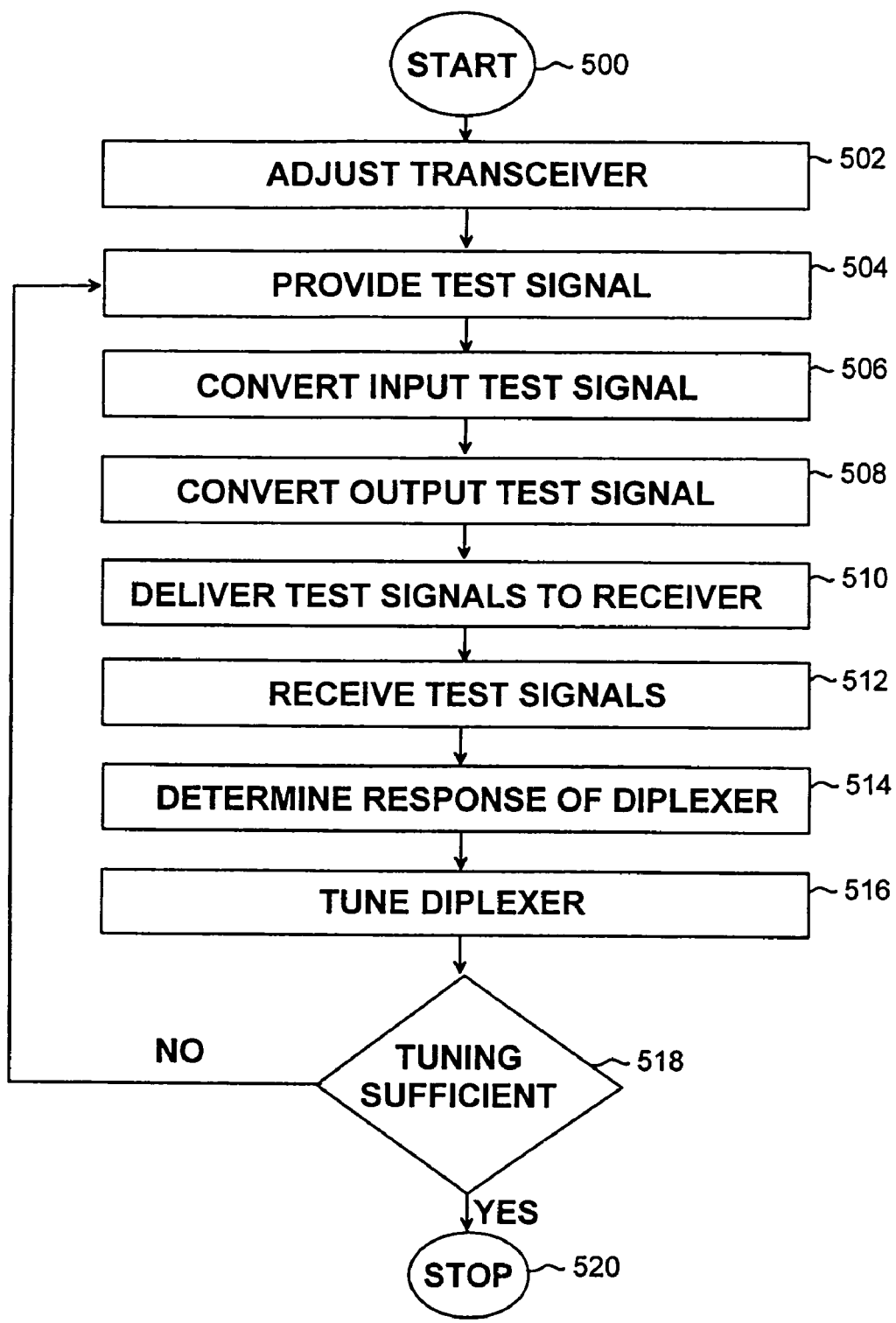
FIG. 5 shows a flow diagram illustrating embodiments of the invention.

With reference to FIG. 5, the invention provides a method of configuring a base station in a cellular telecommunication system. The method starts in 500 and stops in 520. In accordance with the invention, the electronically tunable diplexer 110 connected to the antenna unit 100 is tuned to a sub-band 208 allocated to a base station in 516. In 502, the transceiver 118 connected to the diplexer 110 is adjusted to perform a conversion between a fixed frequency band 224 and a frequency sub-band 208 allocated to the base station. In 504 the diplexer 110 is provided with an input test signal 126 characterizing a frequency sub-band allocated 208 to the base station. In 506, a portion of the input test signal 126 is converted to a receive sub-band 208. In 508, a portion of the output test signal 128A, 128B is converted to a receive sub-band 208 allocated to the base station. In 510, a portion of the input test signal 126 and a portion of an output test signal 128A, 128B generated in the diplexer are delivered to the receiver 120. In 512, a portion of the input test signal 126 and a portion of the output test signal 128A, 128B are received in the receiver 120. In 514, the response of the diplexer 110 to the input test signal 126 is determined based on a received portion of the input test signal 126 and a received portion of the output test signal 128A, 128B.

In an embodiment, the tuning procedure is carried out in cycles. After each tuning cycle, the response of the diplexer to the input test signal 126 is compared with a reference value, and if the tuning suffices, i.e. fulfils the predetermined requirements, the tuning can be stopped. Otherwise, the tuning is started over. The test whether the tuning suffices is performed in 518 in FIG. 5.

In an embodiment, the tuning procedure is carried out during an idle period of transmission of the base station. The tuning procedure may be started, for example, after a certain period of time counted from the previous tuning. It is also possible to start a tuning procedure when the system performance drops.

In an embodiment, tuning is performed in the TX tuning mode and the receive portion 112 of the diplexer 110 is tuned according to the tuning parameters obtained for the transmit portion 114 of the diplexer 110.

In another embodiment, tuning is performed in the RX tuning mode and the transmit portion 112 of the diplexer 110 is tuned according to the tuning parameters obtained for the receive portion 112 of the diplexer 110.

Even though the invention is described above with reference to an example according to the accompanying drawings, it is clear that the invention is not restricted thereto but it can be modified in several ways within the scope of the appended claims.

The invention claimed is:

1. A base station of a cellular telecommunication system, comprising:
    an antenna unit configured to receive and transmit radio frequency signal;
    an electronically tunable diplexer connected to the antenna unit configured to separate a transmit radio frequency band from a receive radio frequency band, a tuning range of the electronically tunable diplexer covering at least two radio frequency sub-bands used in the same transmission direction in a telecommunication system, the electronically tunable diplexer being tunable, on site, to a radio frequency sub-band allocated to a base station according to an electric control signal;
    a transceiver connected to the electronically tunable diplexer configured to perform a conversion between a fixed frequency band and the radio frequency sub-band allocated to the base station; and
    wherein the transceiver includes a signal conversion chain configured to perform at least a portion of the conversion, at least a portion of the signal conversion chain being shared between frequencies within the tuning range of a sub-band.

2. A base station according to claim 1, wherein the electronically tunable diplexer is configured to operate in a receive tuning range covering receive sub-bands of at least two system bands, the electronically tunable diplexer being tunable, on site, to a receive sub-band allocated to the base station.

3. A base station according to claim 1, wherein the electronically tunable diplexer is configured to operate in a transmit tuning range covering transmit sub-bands of at least two system bands, the electronically tunable diplexer being tunable, on site, to a transmit sub-band allocated to the base station.

4. A base station according to claim 1, wherein the electronically tunable diplexer is configured to operate in a receive tuning range covering at least two receive sub-bands of a system band, the electronically tunable diplexer being tunable, during operation, to a receive sub-band allocated to the base station.

5. A base station according to claim 1, wherein the electronically tunable diplexer is configured to operate in a transmit tuning range covering at least two transmit sub-bands of a system band, the electronically tunable diplexer being tunable, during operation, to a transmit sub-band allocated to the base station.

6. A base station according to claim 1, wherein the electronically tunable diplexer is tunable, on site, to provide a passband narrower than a system band allocated to the base station.

7. A base station according to claim 1, further comprising a control unit connected to the electronically tunable diplexer and the transceiver configured to control frequency characteristics of the base station.

8. A base station according to claim 1, wherein the electronically tunable diplexer comprises a receive portion and a transmit portion connected to the antenna unit;
    wherein the transceiver comprises a transmitter connected to the transmit portion of the electronically tunable diplexer, and a receiver connected to the receive portion of the electronically tunable diplexer;
    the base station further comprising a generator connected to the transmitter and configured to provide the electronically tunable diplexer with an input test signal characterizing the radio frequency sub-band allocated to the base station;
    a transceiver loop connected to the electronically tunable diplexer and the transceiver configured to deliver a portion of the input test signal and a portion of an output test signal generated from the input test signal in the electronically tunable diplexer to the receiver;
    an analyzer connected to the receiver and a control unit configured to determine a response of the electronically tunable diplexer to the input test signal based on the portion of the input test signal and the portion of the output test signal; and
    the control unit connected to the electronically tunable diplexer and the generator configured to control tuning of the electronically tunable diplexer based on the response of the electronically tunable diplexer to the input test signal.

9. A base station according to claim 8, wherein the transceiver loop is configured to convert the portion of the input test signal to a receive sub-band allocated to the base station.

10. A base station according to claim 8, wherein the transceiver loop is configured to convert the portion of the output test signal to a receive sub-band allocated to the base station.

11. A method of configuring a base station in a cellular telecommunication system, comprising:
    tuning, on site, an electronically tunable diplexer connected to an antenna unit according to an electric control signal, a tuning range of the electronically tunable diplexer covering at least two radio frequency sub-bands used in the same transmission direction in a telecommunication system, to a radio frequency sub-band allocated to a base station; and
    adjusting a transceiver connected to the electronically tunable diplexer to perform a conversion between a fixed frequency band and the radio frequency sub-band allocated to the base station, the transceiver including a signal conversion chain for performing at least a portion of the conversion, at least a portion of the signal conversion chain being shared between frequencies within the tuning range of a sub-band.

12. A method according to claim 11, further comprising: tuning the electronically tunable diplexer, the tuning range of the electronically tunable diplexer covering receive sub-bands of at least two system bands, to a receive sub-band allocated to the base station.

13. A method according to claim 11, further comprising:
    tuning the electronically tunable diplexer, the tuning range of the electronically tunable diplexer covering transmit sub-bands of at least two system bands, to a transmit sub-band allocated to the base station.

14. A method according to claim 11, further comprising:
    tuning the electronically tunable diplexer, the tuning range of the electronically tunable diplexer covering at least two receive sub-bands of a system band, to a receive sub-band allocated to the base station.

15. A method according to claim 11, further comprising:
tuning the electronically tunable diplexer, the tuning range of the electronically tunable diplexer covering at least two transmit sub-bands of a system band, to a transmit sub-band allocated to the base station.

16. A method according to claim 11, further comprising:
providing the electronically tunable diplexer with an input test signal characterizing the radio frequency sub-band allocated to the base station;
delivering a portion of the input test signal and a portion of an output test signal generated in the electronically tunable diplexer to a receiver;
receiving the portion of the input test signal and the portion of the output test signal in the receiver;
determining a response of the electronically tunable diplexer to the input test signal based on a received portion of the input test signal and a received portion of the output test signal; and
tuning the electronically tunable diplexer based on the response of the electronically tunable diplexer to the input test signal.

17. A method according to claim 16, further comprising: converting the portion of the input test signal to a receive sub-band frequency.

18. A method according to claim 16, further comprising converting the portion of the output test signal to a receive sub-band allocated to the base station.

19. A base station in a cellular telecommunication system, comprising:
tuning means for tuning, on site, an electronically tunable diplexer connected to an antenna unit according to an electric control signal, the a tuning range of the electronically tunable diplexer covering at least two radio frequency sub-bands used in the same transmission direction in the a telecommunication system, to a radio frequency sub-band allocated to the a base station; and
adjusting means for adjusting a transceiver connected to the electronically tunable diplexer to perform a conversion between a fixed frequency band and the radio frequency sub-band allocated to the base station, the transceiver including a signal conversion chain for performing at least a portion of the conversion, at least a portion of the signal conversion chain being shared between frequencies within the tuning range of a sub-band.

* * * * *